United States Patent
Abosch et al.

(10) Patent No.: US 12,480,576 B2
(45) Date of Patent: Nov. 25, 2025

(54) LUBRICATION AND COOLING SYSTEM FOR ROTATABLE COMPONENTS

(71) Applicant: Atieva, Inc., Newark, CA (US)

(72) Inventors: Michael Abosch, San Francisco, CA (US); Emad Dlala, Pleasanton, CA (US); Barnaby James Gerard Lewis, San Francisco, CA (US); Mohammad Mahmoudi, Fremont, CA (US); Azat Suleimenov, Santa Clara, CA (US); Michael Tebbe, Hayward, CA (US); Balazs Palfai, Newark, CA (US); Jiajun Wu, San Jose, CA (US); Richard J. Biskup, Sunnyvale, CA (US); Jeremy Mayer, Mountain View, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/705,057

(22) PCT Filed: Oct. 6, 2022

(86) PCT No.: PCT/US2022/077668
§ 371 (c)(1),
(2) Date: Apr. 26, 2024

(87) PCT Pub. No.: WO2023/076798
PCT Pub. Date: May 4, 2023

(65) Prior Publication Data
US 2025/0012352 A1 Jan. 9, 2025

Related U.S. Application Data

(60) Provisional application No. 63/263,150, filed on Oct. 27, 2021.

(51) Int. Cl.
*F16H 57/04* (2010.01)

(52) U.S. Cl.
CPC ....... *F16H 57/0483* (2013.01); *F16H 57/043* (2013.01); *F16H 57/0471* (2013.01)

(58) Field of Classification Search
CPC ............ F16H 57/037; F16H 57/0471; F16H 57/0483; F16H 57/0493; F16H 57/0494;
(Continued)

(56) References Cited

U.S. PATENT DOCUMENTS 1,921,769 A * 8/1933 Morgan .............. F16H 57/0456
184/6.12
2,247,732 A * 7/1941 Paton .................. F16H 57/0471
184/6.12
(Continued)

FOREIGN PATENT DOCUMENTS

DE 202016002577 U1 7/2017
JP S57139409 U 8/1982
JP 2019120375 A 7/2019

OTHER PUBLICATIONS

International Search Report and Written Opinion for PCT Application No. PCT/US2022/077668, mailed on Dec. 28, 2022, 8 pages.
(Continued)

*Primary Examiner* — Minh Truong
(74) *Attorney, Agent, or Firm* — Brake Hughes Bellermann LLP

(57) ABSTRACT

A fluid flow system for a rotatable shaft assembly includes a first fluid flow device installed in a rotatable shaft, and a second fluid flow device installed in the rotatable shaft, spaced axially apart from the first fluid flow device. The first fluid flow device includes a wall portion having a radial dimension that retains oil in the rotatable shaft. The second fluid flow device includes a wall portion having a radial dimension that facilitates discharge of oil from the radial
(Continued)

shaft. The first and second fluid flow devices each include a plurality of baffles on the respective wall portions thereof. The plurality of baffles drive the flow of fluid in an axial direction, from the first fluid flow device toward the second fluid flow device, as the first and second fluid flow devices rotate together with the rotatable shaft.

16 Claims, 11 Drawing Sheets

(58) Field of Classification Search
CPC .............. F16H 57/0495; F16C 33/6651; F16C 33/6677; F16C 33/6685
See application file for complete search history.

(56) References Cited

U.S. PATENT DOCUMENTS

| | | | |
|---|---|---|---|
| 4,495,830 A * | 1/1985 | Yasue | F16H 57/0423 74/467 |
| 5,609,073 A * | 3/1997 | Spooner | F16H 48/147 184/11.2 |
| 5,624,344 A * | 4/1997 | Yehl | F16H 57/0427 184/6.12 |
| 10,666,103 B2 * | 5/2020 | Yoshizawa | H02K 9/19 |
| 11,894,758 B2 * | 2/2024 | Seo | H02K 1/32 |
| 12,166,406 B2 * | 12/2024 | Uematsu | H02K 7/083 |
| 2007/0017309 A1 * | 1/2007 | Hasegawa | F16H 61/08 74/331 |
| 2009/0261667 A1 | 10/2009 | Matsubara et al. | |
| 2010/0202721 A1 * | 8/2010 | Fukuda | F16C 19/182 384/548 |
| 2011/0057523 A1 | 3/2011 | Li et al. | |
| 2012/0129614 A1 * | 5/2012 | Knoblauch | F16H 57/0427 464/7 |
| 2016/0218595 A1 | 7/2016 | Maekawa et al. | |
| 2019/0017542 A1 * | 1/2019 | Suzuki | F16C 33/6681 |
| 2020/0204021 A1 | 6/2020 | Kim et al. | |
| 2021/0070159 A1 * | 3/2021 | Leber | F16D 3/06 |
| 2021/0123363 A1 | 4/2021 | Krishnan et al. | |
| 2022/0333676 A1 * | 10/2022 | Li | F16H 57/0457 |

OTHER PUBLICATIONS

Extendable European Search Report for European Application No. 22888373.2, mailed Jul. 30, 2025, 9 pages.

* cited by examiner

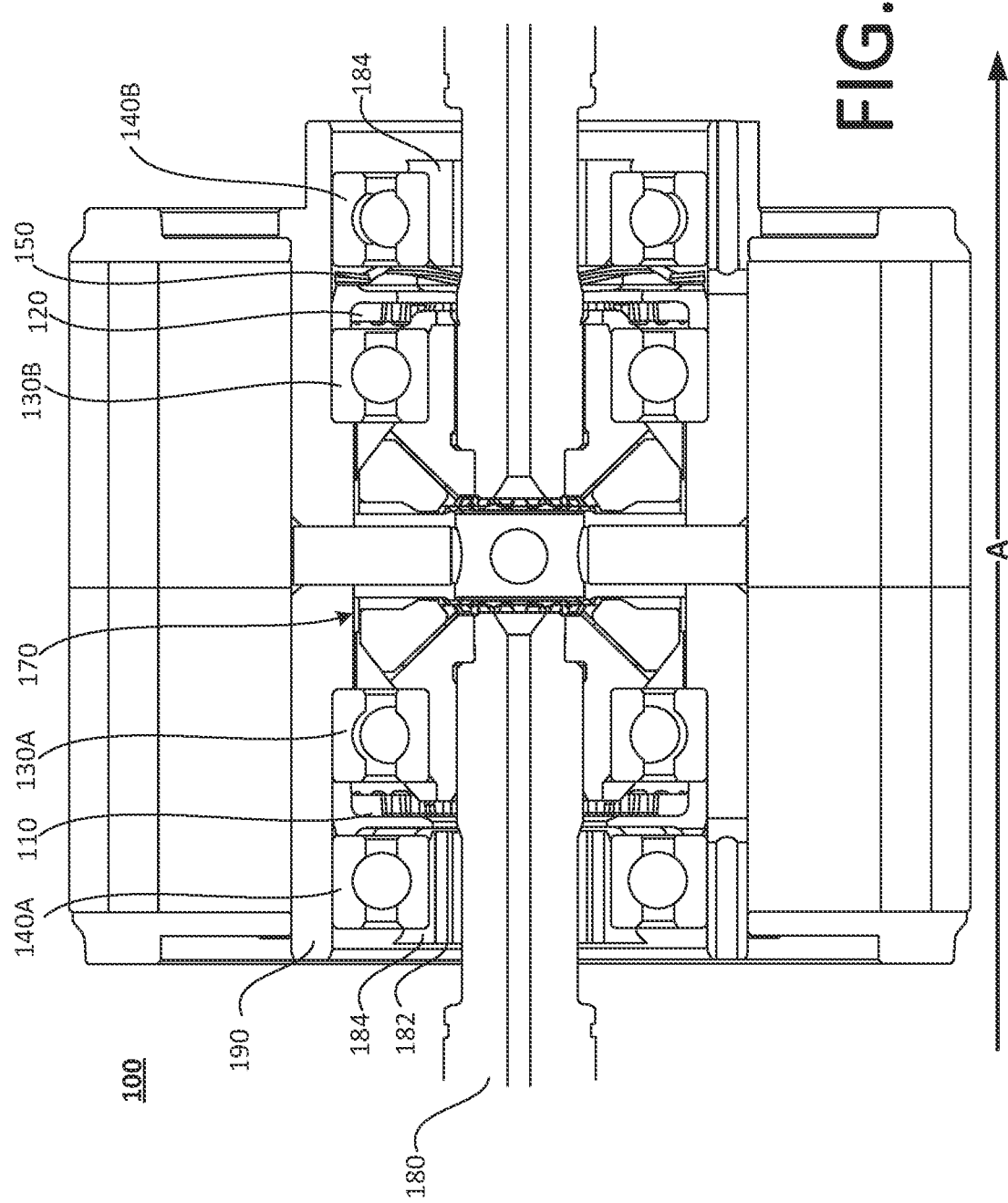

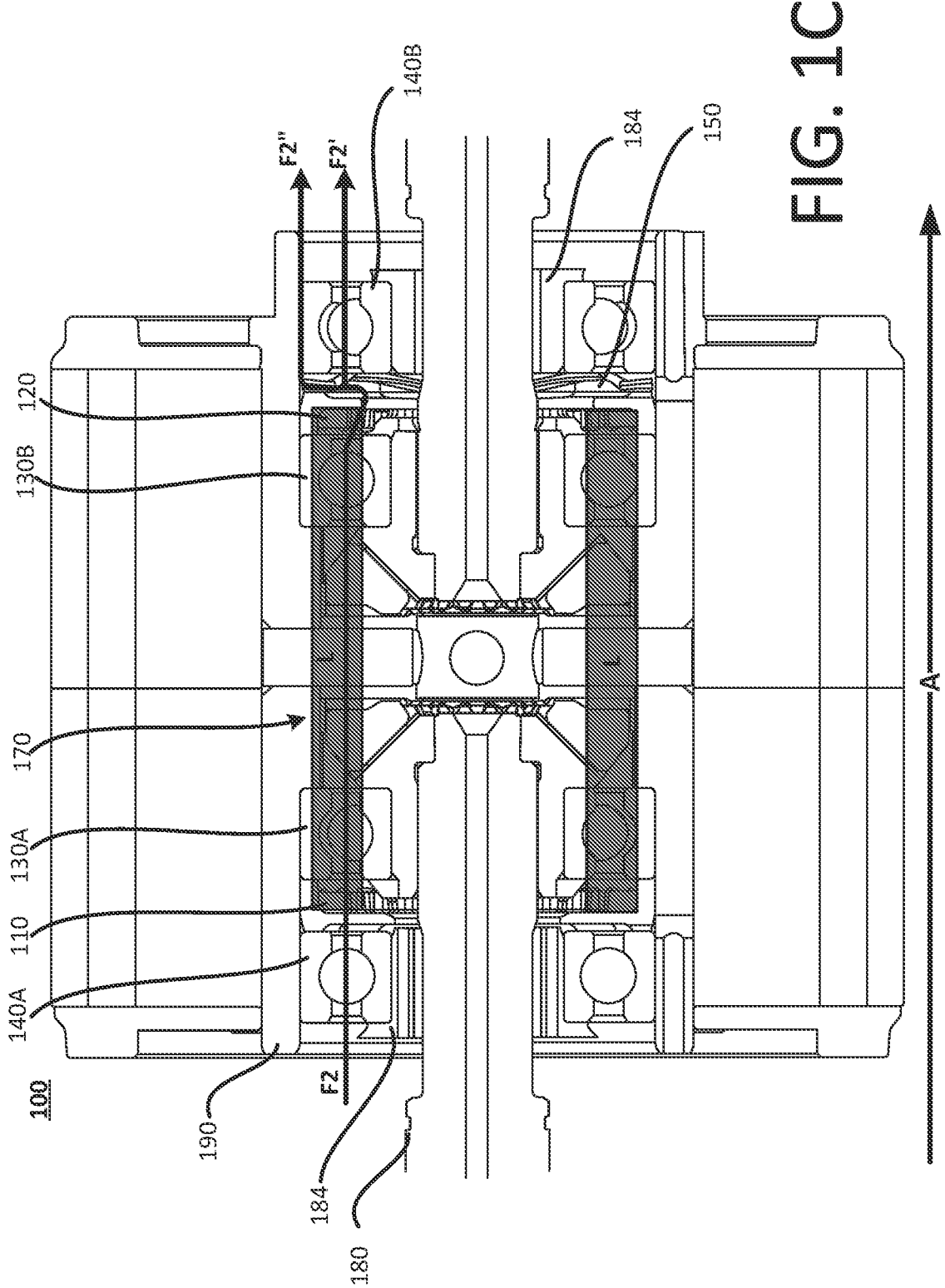

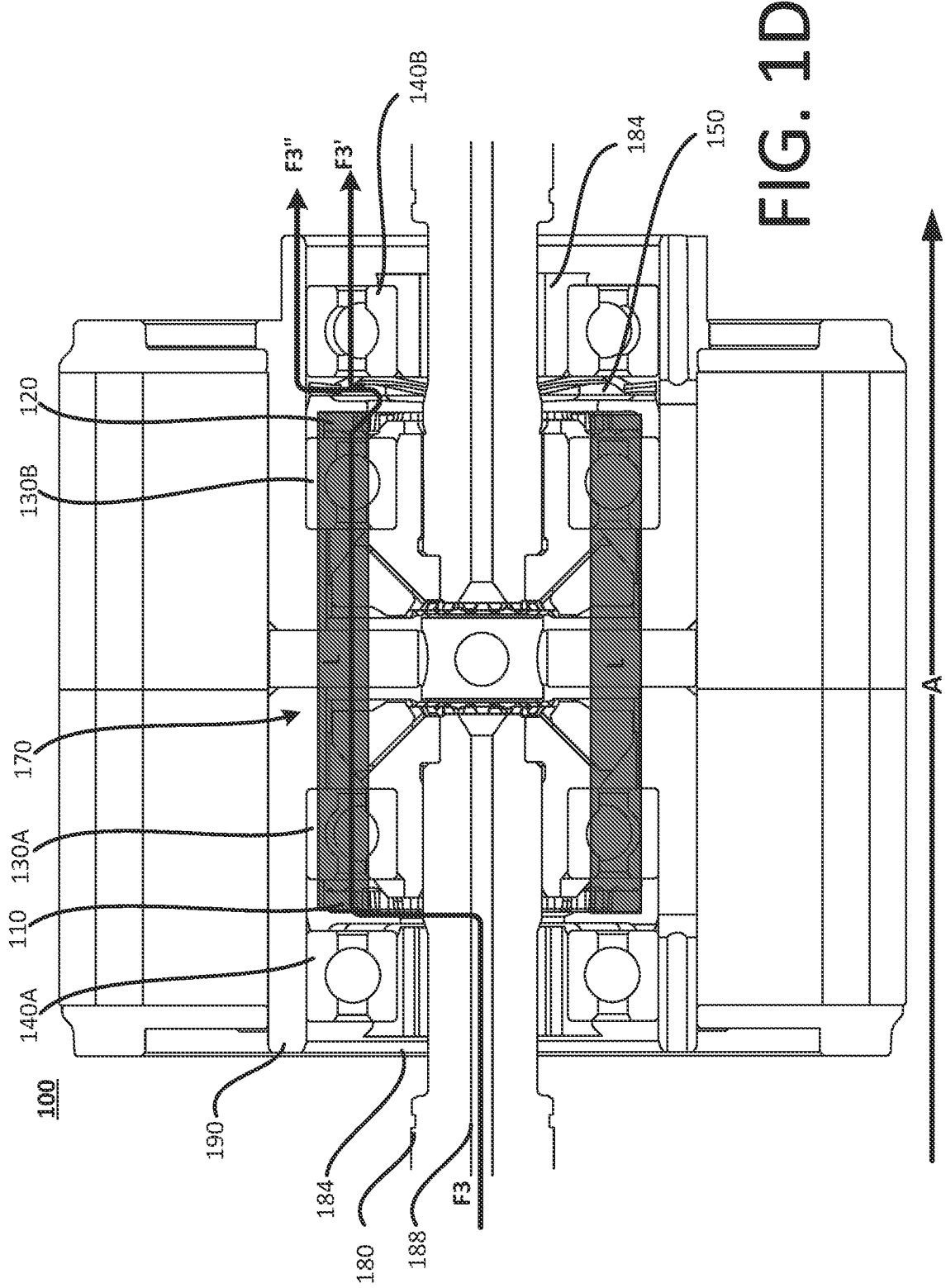

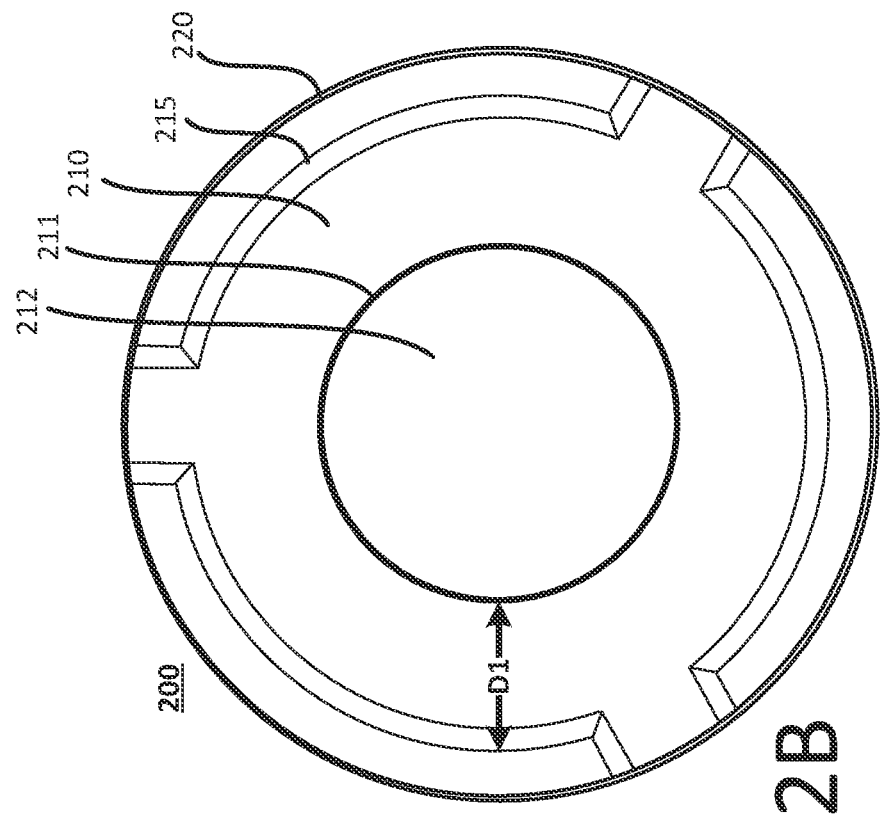
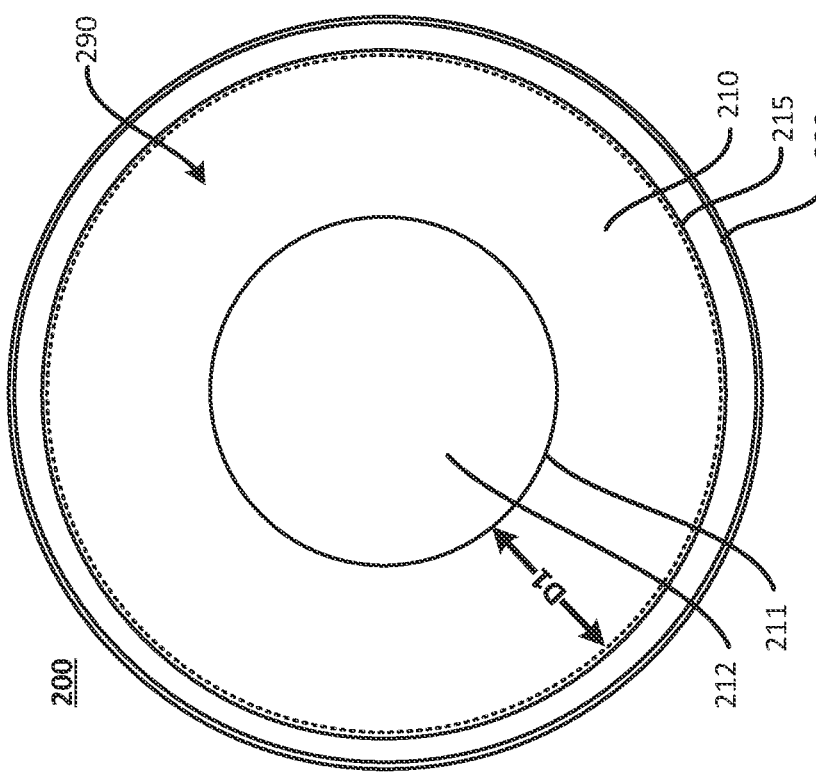
FIG. 2A
FIG. 2B

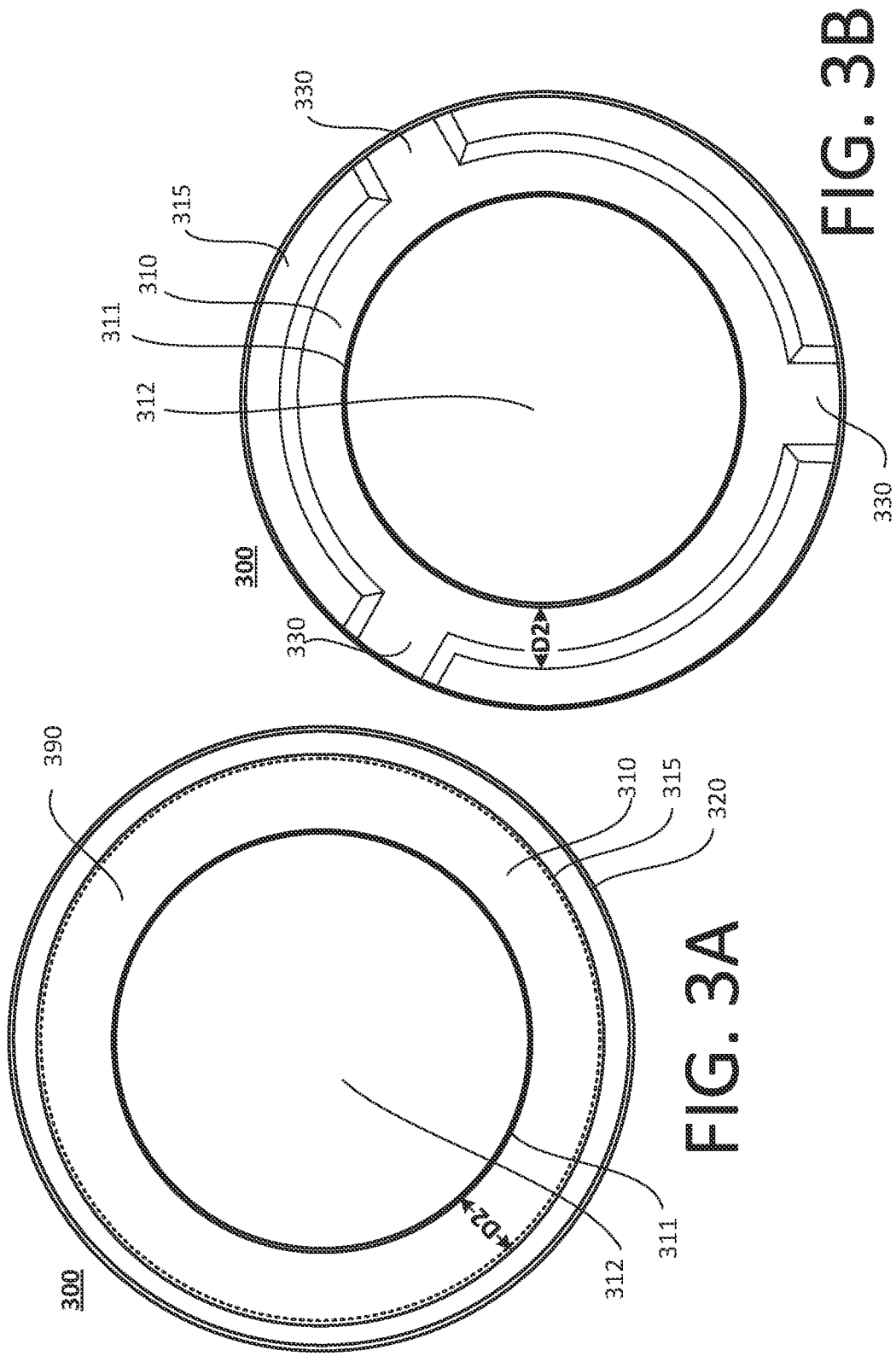

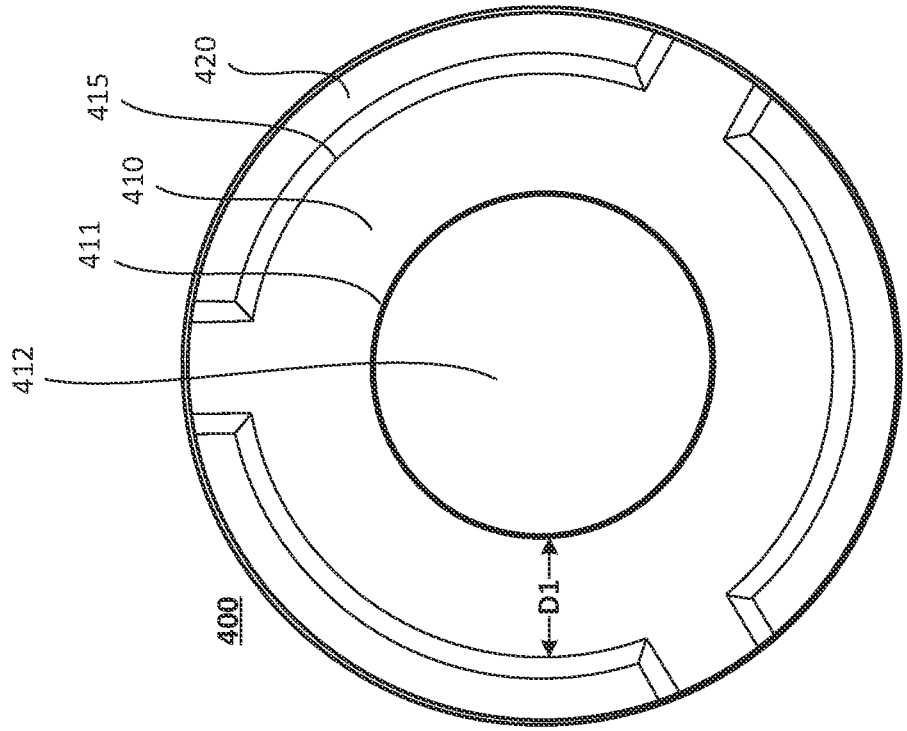
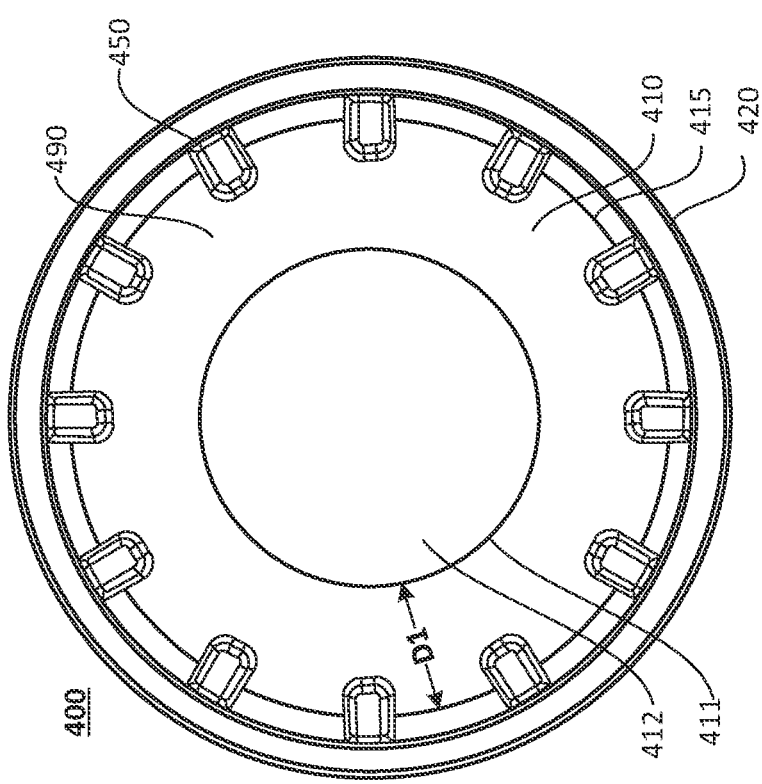
FIG. 4B
FIG. 4A

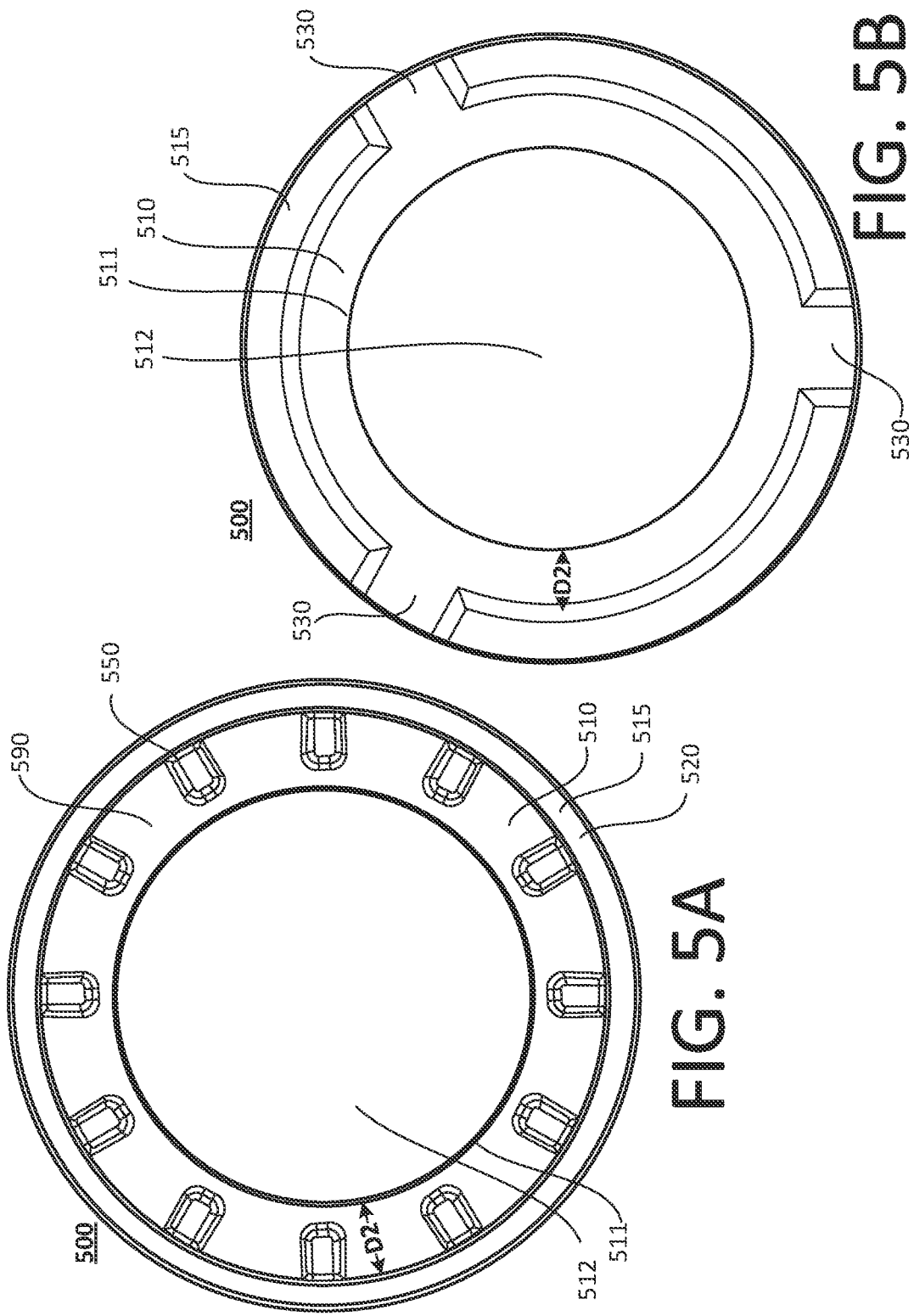

LUBRICATION AND COOLING SYSTEM FOR ROTATABLE COMPONENTS

CROSS-REFERENCE TO RELATED APPLICATION

This application is a 35 U.S.C. § 371 National Phase Entry Application from PCT Application No. PCT/US2022/077668, filed on Oct. 6, 2022, entitled "LUBRICATION AND COOLING SYSTEM FOR ROTATABLE COMPONENTS", and designating the U.S., which claims priority to U.S. Provisional Patent Application No. 63/263,150, filed on Oct. 27, 2021, entitled "LUBRICATION AND COOLING SYSTEM FOR ROTATABLE COMPONENTS the disclosures of which are incorporated by reference herein in their entireties.

FIELD

This relates to lubrication and cooling, and in particular to lubrication and cooling of powertrain components of an electric vehicle.

BACKGROUND

High performance electric vehicles rely on efficient and effective lubrication and cooling to achieve desired levels of performance and reliability, regardless of ambient conditions and/or driving conditions and/or driving practices. Effectiveness of many of the current techniques for cooling powertrain components of an electric vehicle are somewhat inadequate in consistently and effectively providing lubrication and cooling to the individual components. This can result in a degradation in performance and/or reliability of the powertrain and/or drivetrain, which can in turn degrade overall performance and/or reliability of the electric vehicle.

SUMMARY

In one general aspect, a fluid flow system for a rotatable shaft assembly includes a first fluid flow device configured to be coupled in a first portion of a rotatable shaft, the first fluid flow device including at least one physical feature configured to retain oil in the rotatable shaft and drive the oil in an axial direction in the rotatable shaft; and a second fluid flow device configured to be coupled in a second portion of the rotatable shaft, spaced axially apart from the first fluid flow device, the second fluid flow device including at least one physical feature configured to draw the oil axially through the rotatable shaft, from the first fluid flow device toward the second fluid flow device, and to discharge the oil along at least one discharge path from the rotatable shaft.

In some implementations, the at least one physical feature of the first fluid flow device includes a first physical feature defining an inlet for introducing the oil into the rotatable shaft, and for retaining the oil in the rotatable shaft; and a second physical feature configured to drive the oil in an axial direction in the rotatable shaft. In some implementations, the at least one physical feature of the second fluid flow device includes a first physical feature configured to draw the oil axially through the rotatable shaft, from the first fluid flow device toward the second fluid flow device; and a second physical feature configured to discharge the oil along the least one discharge path from the rotatable shaft.

In some implementations, the first fluid flow device includes a wall portion with an opening formed in a central portion thereof, the wall portion defining the first physical feature of the first fluid flow device; a rim portion extending from a circumferential portion of the wall portion, the rim portion defining a mating surface configured to be coupled to a mating surface of the rotatable shaft such that the first fluid flow device rotates together with the rotatable shaft; and a plurality of baffles arranged circumferentially along the rim portion and corresponding portions of the wall portion, the plurality of baffles defining the second physical feature of the first fluid flow device.

In some implementations, the opening of the wall portion defines the inlet for introducing oil into the rotatable shaft, and wherein a radial dimension of the wall portion inhibits a backflow of oil out of the rotatable shaft.

In some implementations, the plurality of baffles of the first fluid flow device extend radially inward along the wall portion, from the rim portion toward the opening, wherein the plurality of baffles of the first fluid flow device are configured to drive the oil in an axial direction toward the second fluid flow device in response to rotation of the rotatable shaft.

In some implementations, the second fluid flow device includes a wall portion with an opening formed in a central portion thereof; a rim portion extending from a circumferential portion of the wall portion, defining a mating surface configured to be coupled to a mating surface of the rotatable shaft such that the second fluid flow device rotates together with the rotatable shaft; a plurality of baffles arranged circumferentially along the rim portion and corresponding portions of the wall portion, the plurality of baffles defining the first physical feature of the second fluid flow device; and a plurality of channels formed in the wall portion, in fluid communication with the opening, the plurality of channels defining the second physical feature of the second fluid flow device.

In some implementations, a radial dimension of the wall portion of the second fluid flow device allows oil to flow in the axial direction through the opening of the second fluid flow device to an adjacent bearing for discharge from the rotatable shaft.

In some implementations, the plurality of baffles of the second fluid flow device extend radially inward along the wall portion of the second fluid flow device, from the rim portion of the second fluid flow device toward the opening of the second fluid flow device, wherein the plurality of baffles of the second fluid flow device are configured to draw the oil in the axial direction from the first fluid flow device in response to rotation of the rotatable shaft.

In some implementations, the plurality of channels of the second fluid flow device are configured to receive a portion of the oil flowing in the axial direction through the opening of the second fluid flow device, and to direct the portion of the oil to an inner surface of the rotatable shaft for discharge from the rotatable shaft.

In some implementations, the first fluid flow device is configured to be transition fit in the rotatable shaft, assembled between a first outer bearing and a first inner bearing, and the second fluid flow device is configured to be transition fit in the rotatable shaft, assembled between a second inner bearing and a second outer bearing, spaced apart from the assembled first outer bearing, first fluid flow device and first inner bearing.

In some implementations, the fluid flow system is configured to circulate the oil between the first fluid flow device and the second fluid flow device for at least one of cooling or lubrication of differential components in a space formed between the first fluid flow device and the second fluid flow device.

In another general aspect, a fluid flow system includes a first fluid flow device coupled in a first portion of a rotatable shaft assembly, and a second fluid flow device coupled in a second portion of the rotatable shaft assembly, spaced axially apart from the first fluid flow device. The first fluid flow device may include a wall portion; an inlet defined in a central portion of the wall portion for introduction of cooling media into the rotatable shaft assembly, the wall portion being configured to retain the cooling media in the rotatable shaft assembly; and a rim portion extending along a circumferential portion of the wall portion, the rim portion defining a mating surface configured to be coupled to a mating surface of an outer shaft of the rotatable shaft assembly. The second fluid flow device may include a wall portion; an opening defined in a central portion of the wall portion, the opening being configured to guide the cooling media to at least one discharge path for discharge from the rotatable shaft assembly; and a rim portion extending along a circumferential portion of the wall portion, the rim portion defining a mating surface configured to be coupled to a mating surface of the outer shaft of the rotatable shaft assembly.

In some implementations, a radial dimension of the wall portion of the first fluid flow device inhibits backflow of the cooling media to retain the cooling media in the rotatable shaft assembly.

In some implementations, the first fluid flow device includes at least one baffle at a portion of the rim portion and a corresponding portion of the wall portion of the first fluid flow device, wherein the at least one baffle is configured to drive the cooling media axially through the rotatable shaft assembly toward the second fluid flow device.

In some implementations, the at least one baffle includes a plurality of baffles arranged along the rim portion and corresponding portions of the wall portion of the first fluid flow device, extending radially inward from the rim portion towards the opening of the first fluid flow device, the plurality of baffles being configured to drive the cooling media axially through the rotatable shaft assembly toward the second fluid flow device.

In some implementations, a radial dimension of the wall portion of the second fluid flow device is less than a radial dimension of the wall portion of the first fluid flow device, and wherein the opening in the wall portion of the second fluid flow device is configured to discharge a first portion of the cooling media from the rotatable shaft assembly through a first discharge path.

In some implementations, at least one channel is formed in the rim portion of the second fluid flow device, wherein the at least one channel is configured to discharge a second portion of the cooling media out of the rotatable shaft assembly through a second discharge path.

In some implementations, the at least one channel includes a plurality of radial channels formed in the rim portion of the second fluid flow device, wherein the plurality of radial channels are configured to discharge the second portion of the cooling media out of the rotatable shaft assembly through the second discharge path.

In some implementations, the first discharge path discharges the first portion of the cooling media along the mating surface of the outer shaft, and the second discharge path discharges the second portion of the cooling media to an adjacent bearing.

In some implementations, the second fluid flow device includes at least one baffle at a portion of the rim portion and a corresponding portion of the wall portion of the second fluid flow device, extending radially inward from the rim portion toward the opening of the second fluid flow device, wherein the at least one baffle is configured to draw the cooling media axially through the rotatable shaft assembly from the first fluid flow device toward the second fluid flow device.

The details of one or more implementations are set forth in the accompanying drawings and the description below. Other features will be apparent from the description and drawings, and from the claims.

BRIEF DESCRIPTION OF THE DRAWINGS

In the drawings, like reference symbols or numerals are used to indicate like elements wherever practical FIGS. 1A through 1D are schematic cross-sectional views of an example portion of a lubricating and cooling system for a rotatable shaft assembly.

FIG. 2A is a first axial end view, and FIG. 2B is a second axial end view, of an example first fluid flow device.

FIG. 3A is a first axial end view, and FIG. 3B is a second axial end view of an example second fluid flow device.

FIG. 4A is a first axial end view, and FIG. 4B is a second axial end view of an example first fluid flow device.

FIG. 5A is a first axial end view, and FIG. 5B is a second axial end view of an example second fluid flow device.

DETAILED DESCRIPTION

Figure 1B:
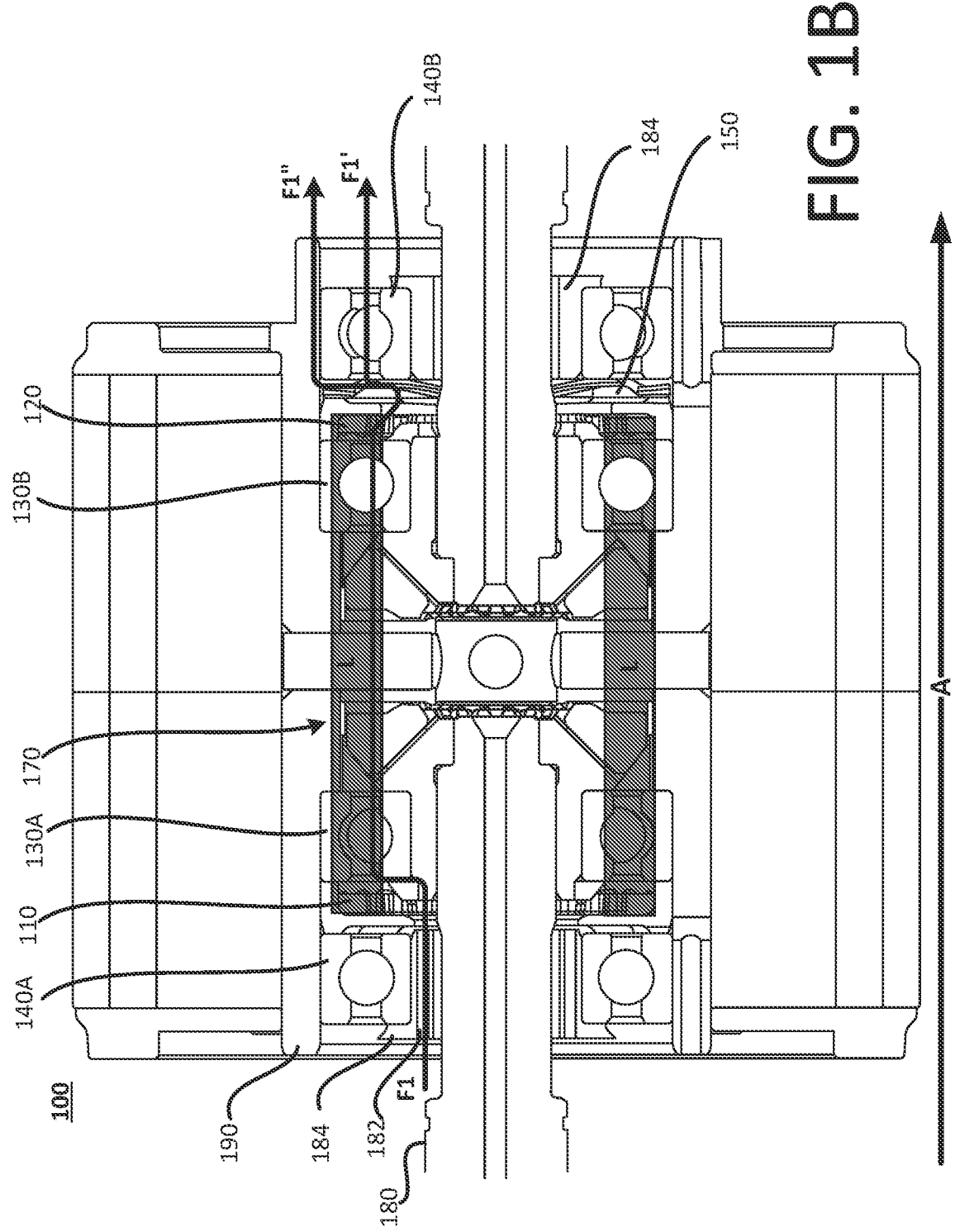

Lubrication and cooling systems, in accordance with implementations described herein, are generally applicable to powertrain and/or drivetrain and/or motor components for electric vehicles (EVs). Hereinafter, the term EV may be used to refer to an all-electric vehicle, a plug-in hybrid vehicle, a hybrid vehicle including an electric drive system, and other applications having at least one electric motor.

Systems and methods described herein can provide improved lubrication and/or cooling to various components of a powertrain and/or a drivetrain of an electric vehicle. Systems and methods described herein make use of flow management and control features that can efficiently and effectively direct lubrication and/or cooling media into a component to be lubricated and/or cooled, can distribute or circulate the cooling media through the component, and can discharge the cooling media from the component. Lubrication and/or cooling provided by systems and methods described herein may be adaptable in response to operational conditions of a component to be lubricated and/or cooled.

FIGS. 1A through 1D are schematic views of an example portion of system making use of a lubricating and cooling system, in accordance with implementations described herein. FIG. 1E is an exploded perspective view of some of the components shown in FIGS. 1A through 1D. The present subject matter may be applied to other systems of components, for example, rotatable components, that would benefit from consistent, uniform distribution of lubrication and cooling. The example portion of the powertrain system shown in FIGS. 1A-1E is an example portion of a powertrain system of an electric vehicle, and in particular a gearbox of an electric vehicle, simply for purposes of discussion and illustration. The principles to be described herein may be applied to other systems of components, for example, rotatable components, that would benefit from consistent, uniform distribution of lubrication and cooling.

FIG. 1A is a schematic cross-sectional view of an example rotatable shaft assembly 100. The example rotatable shaft assembly 100 includes a gearset 170 coupled in an outer shaft 190. A first fluid flow device 110 is positioned in the outer shaft 190, spaced axially apart from a second fluid flow device 120 positioned in the outer shaft 190, such that the first and second fluid flow devices 110, 120 rotate together with the outer shaft 190. The first fluid flow device 110 is positioned between a first inner bearing 130A and a first outer bearing 140A. The second fluid flow device 120 is positioned between a second inner bearing 130B and a second outer bearing 140B. The first inner bearing 130A, first outer bearing 140A, first fluid flow device 110, second inner bearing 130B, second outer bearing 140B and second fluid flow device 120 are mounted on an output shaft 180 supported by a shaft support structure 184. In the example shown in FIG. 1A, a spacing device 150 is positioned between the second fluid flow device 120 and the second outer bearing 140B. The spacing device 150 may act as a shim to maintain a relative position of the components as illustrated. For example, the spacing device 150 may be a biasing device, such as a leaf spring, that exerts a force, for example, an axial force in the orientation shown in FIG. 1A, to maintain a relative position and/or fit of the components relative to the outer shaft 190. That is, the first fluid flow device 110 and the second fluid flow device 120 may be transition fit, or interference fit, into the interior of the outer shaft 190, such that the first fluid flow device 110 and the second fluid flow device 120 rotate together with the outer shaft 190. In this arrangement, the spacing device 150 may be positioned so as to maintain a relative position of the assembled components.

In the example shown in FIG. 1A, the spacing device 150 is positioned between the second fluid flow device 120 and the second outer bearing 140B, simply for purposes of discussion and illustration. The spacing device 150 may be located between other components to maintain a relative position of the components as assembled. In the example shown in FIG. 1A, the gearset 170 includes example differential components, between the first and second fluid flow devices 110, 120, simply for purposes of discussion and illustration. Lubrication and/or cooling characteristics provided by the first and second fluid flow devices 110, 120 can be applied to other types of components, for example, rotatable components, that would benefit from lubrication and/or cooling in the manner to be described hereinafter.

Lubrication and/or cooling media such as, for example, oil, may be introduced into the rotatable shaft assembly 100 for flow through the rotatable shaft assembly 100 in the axial direction shown by the arrow A in FIG. 1A. In some examples, features, for example physical features of the first fluid flow device 110 may inhibit backflow of the oil, i.e., flow of the oil in a direction opposite the axial direction A, thus preventing the oil from leaving the rotatable shaft assembly 100 and/or maintaining the oil within the rotatable shaft assembly 100 for lubrication and/or cooling of the components. In some examples, features, for example, one or more physical features, of the first fluid flow device 110 may guide or direct the flow of oil in the axial direction A, and/or may drive the flow of oil for circulation through the rotatable shaft assembly 100. In some examples, one or more physical features of the second fluid flow device 120 may guide the flow of oil in the axial direction A, for discharge from the rotatable shaft assembly 100. In some examples, the one or more physical features may guide the axial flow of oil for discharge from one or more discharge outlets.

Figure 1E:
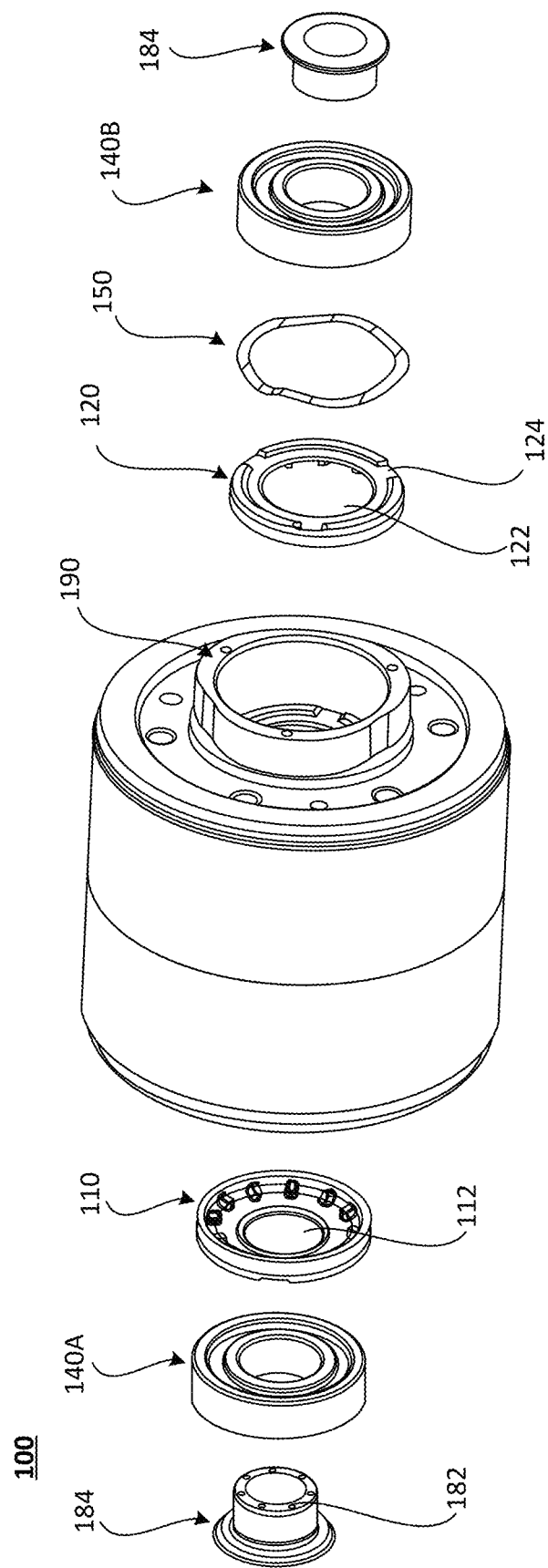
FIG. 1E is an exploded perspective view of an example portion of the lubricating and cooling system shown in FIGS. 1A through 1D.

In some examples, lubrication and/or cooling media, or fluid, such as oil, may be introduced into the rotatable shaft assembly 100 through one or more openings 182 in the shaft support structure 184, as shown by the arrow F1 in FIG. 1B, through an open portion 112 (see FIG. 1E; not shown in detail FIGS. 1A and 1B) of the first fluid flow device 110 and into the first inner bearing 130A. From the first inner bearing 130A, the lubrication and/or cooling media, or oil, flows through the gearset 170, for circulation through the rotatable components received in the gearset 170 (i.e., the differential components in the example arrangement shown in FIGS. 1A and 1B). The oil then flows through the second inner bearing 130B toward the second fluid flow device 120, where a first portion of the oil flows through a first opening 122 (see FIG. 1E; not shown in detail in FIGS. 1A and 1B) for discharge from the rotatable shaft assembly 100 through the second outer bearing 140B along the arrow F1'. A second portion of the oil flows through one or more second openings 124 (see FIG. 1E; not shown in detail in FIGS. 1A and 1B) for discharge via a surface of the outer shaft 190, along the arrow F1". In some examples, features, for example physical features, of the first fluid flow device 110 and/or the second fluid flow device 120 drive the flow of oil axially through the rotatable shaft assembly 100, and facilitate distribution and/or circulation of the oil through the rotatable components received in the rotatable shaft assembly 100. For example, physical features of the first fluid flow device 110 and/or physical features of the second fluid flow device 120 may cause a layer L (illustrated in shadow in the cross-sectional view shown in FIG. 1B) of oil to be distributed, for example, substantially uniformly distributed, within the rotatable shaft assembly 100 to provide for circulation of the oil throughout the rotatable shaft assembly 100 and lubrication and/or cooling to the rotatable components.

In some examples, lubrication and/or cooling media, or fluid, such as oil, may be introduced into the rotatable shaft assembly 100 by spraying or jetting oil into the first outer bearing 140A, as shown by the arrow F2 in FIG. 1C. Oil introduced in this manner flows through the open portion 112 of the first fluid flow device 110 and through the first inner bearing 130A, for circulation through the rotatable components of the gearset 170 (i.e., the differential components in the example arrangement shown in FIGS. 1A-1C). The oil then flows through the second inner bearing 130B toward the second fluid flow device 120, where a first portion of the oil flows through the first opening 122 for discharge from the rotatable shaft assembly 100 through the second outer bearing 140B along the arrow F2'. A second portion of the oil flows through one or more second openings 124 for discharge via a surface of the outer shaft 190, along the arrow F2". In some examples, features, for example physical features, of the first fluid flow device 110 and/or the second fluid flow device 120 drive the flow of oil axially through the rotatable shaft assembly 100, and facilitate distribution and/or circulation of the oil through the rotatable components received in the rotatable shaft assembly 100. For example, physical features of the first fluid flow device 110 and/or physical features of the second fluid flow device 120 may cause the layer L of oil to be distributed, for example, substantially uniformly distributed, within the rotatable shaft assembly 100 to provide for circulation of the oil throughout the rotatable shaft assembly 100 and lubrication and/or cooling to the rotatable components.

In some examples, lubrication and/or cooling media, or fluid, such as oil, may be introduced into the rotatable shaft assembly 100 through a channel 188 in the output shaft 180, as shown by the arrow F3 in FIG. 1D. Oil introduced in this manner flows through the open portion 112 of the first fluid flow device 110 and through the first inner bearing 130A, for circulation through the rotatable components of the gearset 170 (i.e., the differential components in the example arrangement shown in FIGS. 1A-1D). The oil then flows through the second inner bearing 130B toward the second fluid flow device 120, where a first portion of the oil flows through the first opening 122 for discharge from the rotatable shaft assembly 100 through the second outer bearing 140B along the arrow F3'. A second portion of the oil flows through one or more second openings 124 for discharge via a surface of the outer shaft 190, along the arrow F3". In some examples, features, for example physical features, of the first fluid flow device 110 and/or the second fluid flow device 120 drive the flow of oil axially through the rotatable shaft assembly 100, and facilitate distribution and/or circulation of the oil through the rotatable components received in the rotatable shaft assembly 100. For example, physical features of the first fluid flow device 110 and/or physical features of the second fluid flow device 120 may cause the layer L of oil to be distributed, for example, substantially uniformly distributed, within the rotatable shaft assembly 100 to provide for circulation of the oil throughout the rotatable shaft assembly 100 and lubrication and/or cooling to the rotatable components.

FIGS. 2A and 2B illustrate an example first fluid flow device 200 (such as, for example the first fluid flow device 110 described above with respect to FIGS. 1A-1E). In particular, FIG. 2A is a first axial end view and FIG. 2B is a second axial end view of the example first fluid flow device 200. The example first fluid flow device 200 shown in FIGS. 2A and 2B may be incorporated into the example rotatable shaft assembly 100 shown in FIGS. 1A-1E.

As shown in FIGS. 2A and 2B, the example first fluid flow device 200 includes a wall portion 210, with a rim portion 220 extending from an outer peripheral portion 215, or an outer circumferential portion 215, of the wall portion 210. The rim portion 220 may be positioned against, or fit against, an inner circumferential surface of the outer shaft 190 (see, for example, FIGS. 1A-1D). For example, the first fluid flow device 200 may be transition fit, or interference fit in the outer shaft 190 at mating surfaces of the rim portion 220 and the outer shaft 190 such that the first fluid flow device 200 rotates together with the outer shaft 190. The wall portion 210 and the rim portion 220 define a fluid flow area 290 of the first fluid flow device 200. An inner peripheral portion 211, or an inner circumferential portion 211, of the wall portion 210 defines an opening 212 at a central portion of the wall portion 210, such that the wall portion 210 has a radial dimension D1 from the inner peripheral portion 211 to the outer peripheral portion 215 of the wall portion 210 of the first fluid flow device 200. The opening 212 defines an inlet through which cooling media, such as oil, can be introduced.

The radial dimension D1 of the wall portion 210 of the first fluid flow device 200 may be such that the wall portion 210 retains oil, introduced through the opening 212, within the rotatable shaft assembly 100. For example, the radial dimension D1 of the wall portion 210 is large enough to inhibit the backflow of oil from within the rotatable shaft assembly 100. Thus, the radial dimension D1 of the wall portion 210 of the first fluid flow device 200 may define a first physical feature that retains the oil within the rotatable shaft assembly 100 and inhibits backflow. Retention of the oil within the rotatable shaft assembly 100 may facilitate the availability of oil for circulation through the rotatable shaft assembly 100, for lubrication and/or cooling of the components of the rotatable shaft assembly 100.

FIGS. 3A and 3B illustrate an example second fluid flow device 300 (such as, for example the second fluid flow device 120 described above with respect to FIGS. 1A-1E). In particular, FIG. 3A is a first axial end view, and FIG. 3B is a second axial end view of the example second fluid flow device 300. The example second fluid flow device 300 shown in FIGS. 3A and 3B may be incorporated into the example rotatable shaft assembly 100 shown in FIGS. 1A-1E.

As shown in FIGS. 3A and 3B, the example second fluid flow device 300 includes a wall portion 310, with a rim portion 320 extending from an outer peripheral portion 315 of the wall portion 310. The wall portion 310 and the rim portion 320 define a fluid flow area 390 of the second fluid flow device 300. The rim portion 320 may be positioned against, or fit against, an inner circumferential surface of the outer shaft 190. For example, the second fluid flow device 300 may be transition fit, or interference fit in the outer shaft 190 at mating surfaces of the rim portion 320 and the outer shaft 190, such that the second fluid flow device 300 rotates together with the outer shaft 190. An inner peripheral portion 311 of the wall portion 310 defines an opening 312 at a central portion of the wall portion 310, such that the wall portion 310 has a radial dimension D2 from the inner peripheral portion 311 to the outer peripheral portion 315 of the wall portion 310 of the second fluid flow device 300.

In some examples, the radial dimension D2 of the wall portion 310 of the second fluid flow device 300 is less than the radial dimension D1 of the wall portion 210 of the first fluid flow device 200. The radial dimension D2 of the wall portion 310 of the second fluid flow device 300 may be such that the wall portion 310 allows oil from within the rotatable shaft assembly 100 (in particular, from the second inner bearing 130B) to flow towards the adjacent second outer bearing 140B for discharge from the rotatable shaft assembly 100. For example, the radial dimension D2 of the wall portion 310 is small enough to allow a first portion of the oil (for example, from the second inner bearing 130B) to flow through the opening 312, such that the wall portion 310 does not inhibit the flow of oil to the second outer bearing 140B for eventual discharge from the rotatable shaft assembly 100 (for example, at the arrow F1 shown in FIG. 1B).

In some examples, one or more channels 330 are formed in a side of the wall portion 310 facing the spacing device 150 and the second outer bearing 140B. The one or more channels 330 are in communication, for example fluid communication, with the opening 312. A second portion of the oil flowing through the opening 312 of the second fluid flow device 300 can be directed through the one or more channels 330, for discharge at a corresponding portion of the outer shaft 190 (for example, at the arrows F1", F2" and F3" shown in FIGS. 1B-1D, respectively). In the example shown in FIGS. 3A and 3B, the one or more channels 330 are radial channels. The principles described herein can be applied to channels having other orientations and/or combinations of orientations.

A fluid flow system, in accordance with implementations described herein, can provide lubrication and/or cooling using the first fluid flow device 200 with a wall portion 210 having the radial dimension D1, and the second fluid flow device 300 with a wall portion 310 having the radial dimension D2, in which D1 is greater than D2, to promote axial flow of lubrication and/or cooling media, or fluid, such as oil, through the rotatable shaft assembly as described above.

Figure 4C:
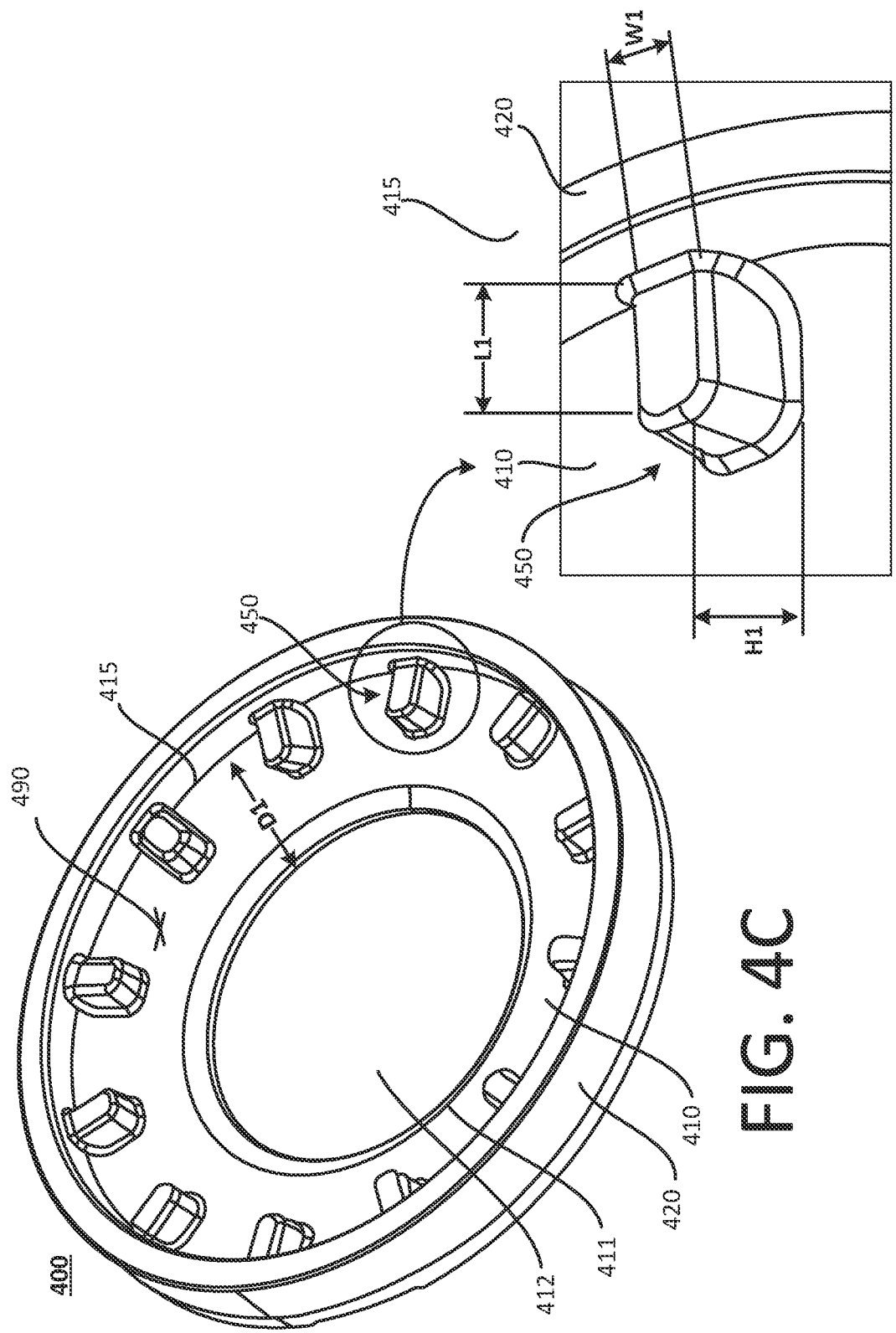
FIG. 4C is a perspective view of the example first fluid flow device shown in FIGS. 4A and 4B.

FIGS. 4A-4C illustrate an example first fluid flow device 400. In particular, FIG. 4A is a first axial end view, FIG. 4B is a second axial end view, and FIG. 4C is a perspective view, of the example first fluid flow device 400. The example first fluid flow device 400 shown in FIGS. 4A-4C may be incorporated into the example rotatable shaft assembly 100 shown in FIGS. 1A-1E.

As shown in FIGS. 4A-4C, the example first fluid flow device 400 includes a wall portion 410, with a rim portion 420 extending from an outer peripheral portion 415, or an outer circumferential portion 415, of the wall portion 410. The rim portion 420 may be positioned against, or fit against, an inner circumferential surface of the outer shaft 190. For example, the first fluid flow device 400 may be transition fit, or interference fit in the outer shaft 190 at mating surfaces of the rim portion 420 and the outer shaft 190 such that the first fluid flow device 400 rotates together with the outer shaft 190. The wall portion 410 and the rim portion 420 define a fluid flow area 490 of the first fluid flow device 400. An inner peripheral portion 411, or an inner circumferential portion 411, of the wall portion 410 defines an opening 412 at a central portion of the wall portion 410, such that the wall portion 410 has a radial dimension D1 (similar to the first fluid flow device 200 described above with respect to FIGS. 2A and 2B) from the inner peripheral portion 411 to the outer peripheral portion 415 of the wall portion 410 of the first fluid flow device 400. The opening 412 defines an inlet through which oil can be introduced.

The example first fluid flow device 400 shown in FIGS. 4A-4C includes one or more protrusions 450, or baffles 450, extending radially inward, from the rim portion 420 and a corresponding portion of the wall portion 410 toward the opening 412, into the fluid flow area 490. Each of the one or more baffles 450 may have a height H1, a width W1, and a length L1, as shown in FIG. 4C. The height H1, width W1 and length L1 of the baffles 450 may vary between different implementations of the first fluid flow device 400, based on a number of baffles 450, an arrangement of the baffles 450, fluid flow velocities, lubrication and cooling requirements, system sizing, and other such factors.

As with the first fluid flow device 200 described above with respect to FIGS. 2A and 2B, the radial dimension D1 of the wall portion 410 of the first fluid flow device 400 may be such that the wall portion 410 is large enough to inhibit the backflow of oil from within the rotatable shaft assembly 100. Thus, the radial dimension D1 of the wall portion 410 of the first fluid flow device 400 may define a first physical feature that retains the oil within the rotatable shaft assembly 100 and inhibits backflow. Retention of the oil within the rotatable shaft assembly 100 may facilitate the availability of oil for circulation through the rotatable shaft assembly 100, for lubrication and/or cooling of the components of the rotatable shaft assembly 100. The one or more protrusions 450, or baffles 450, may further facilitate the driving of the oil in the axial direction, and the distribution and/or circulation of the oil as it moves axially in the rotatable shaft assembly 100.

In the example arrangement shown in FIGS. 4A-4C, the first fluid flow device 400 includes a plurality of baffles 450, all having substantially the same height and/or width and/or length, with the plurality of baffles 450 being arranged circumferentially about an axial centerline of the first fluid flow device 400, and arranged symmetrically about a central plane of the first fluid flow device 400, simply for purposes of discussion and illustration. In some examples, the first fluid flow device 400 can include more, or fewer, baffles 450 that shown in FIGS. 4A-4C, and/or combinations of sizes of baffles 450 and/or arrangements of baffles 450 about the axial centerline and/or central plane of the first fluid flow device 400. A size and/or combination of sizes and/or an arrangement of the plurality of baffles 450 along the rim portion 420 of the first fluid flow device 400 may be selected to drive the flow of oil from the opening 412 in an axial direction, for circulation through the rotatable shaft assembly 100. That is, a size and/or a number and/or an arrangement of the baffles 450 along the rim portion 420 of the first fluid flow device 400 may be selected so that the action imparted on the oil by the baffles 450 drives the flow of oil in the desired direction. Thus, the baffles 450 may define a second physical feature of the first fluid flow device 400 that drives the oil axially through the rotatable shaft assembly 100, and circulates/distributes the oil as the oil moves axially, with the first fluid flow device 400 rotating together with the outer shaft 190 and the baffles 450 acting on the oil in the rotatable shaft assembly 100.

Figure 5C:
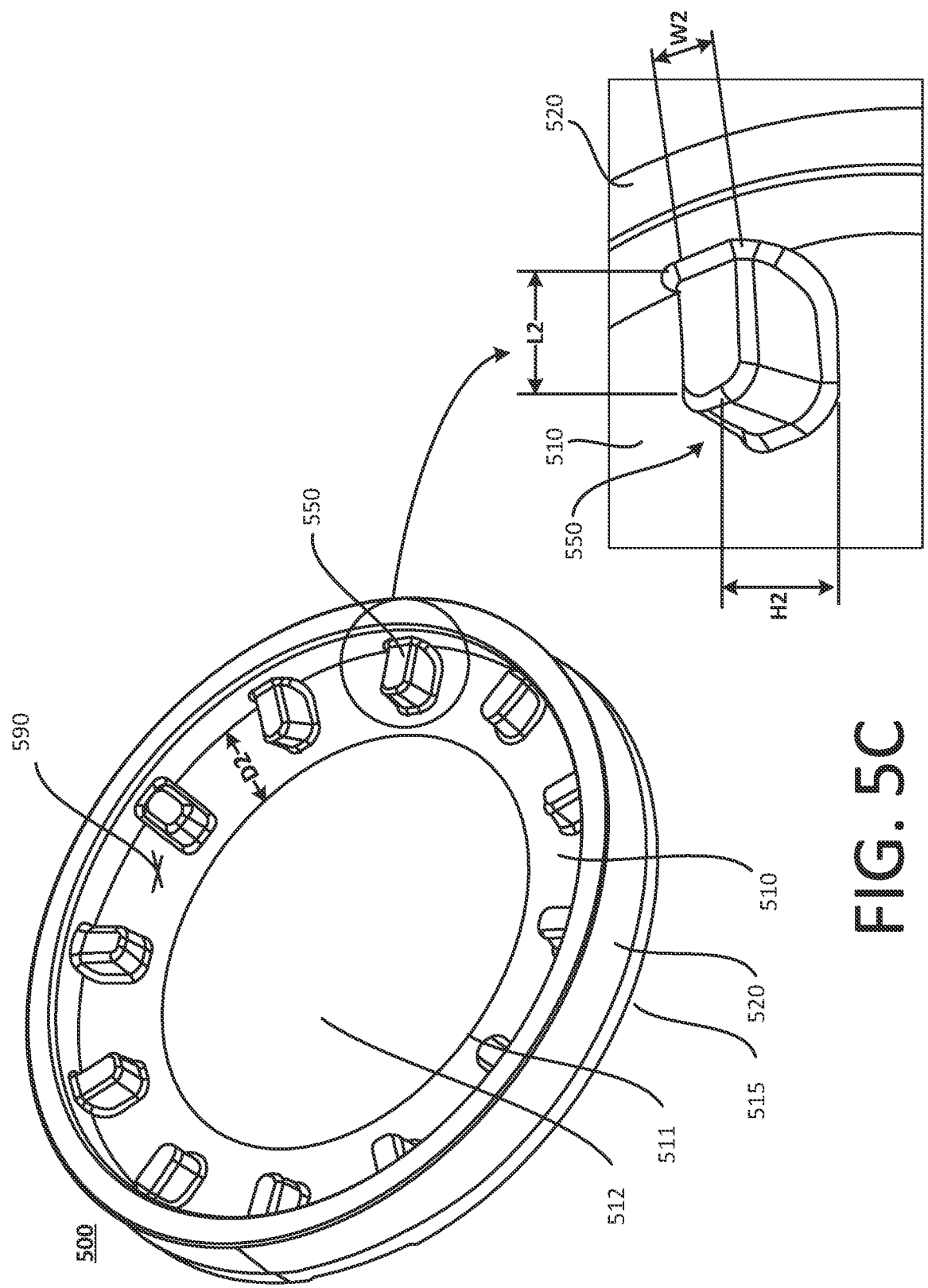
FIG. 5C is a perspective view of the example second fluid flow device shown in FIGS. 5A and 5B.

FIGS. 5A-5C illustrate an example second fluid flow device 500. In particular, FIG. 5A is a first axial end view, FIG. 5B is a second axial end view, and FIG. 5C is a perspective view, of the example second fluid flow device 500. The example second fluid flow device 500 shown in FIGS. 5A-5C may be incorporated into the example rotatable shaft assembly 100 shown in FIGS. 1A-1E.

As shown in FIGS. 5A-5C, the example second fluid flow device 500 includes a wall portion 510, with a rim portion 520 extending from an outer peripheral portion 515 of the wall portion 510. The wall portion 510 and the rim portion 520 define a fluid flow area 590 of the second fluid flow device 500. The rim portion 520 may be positioned against, or fit against, an inner circumferential surface of the outer shaft 190. For example, the second fluid flow device 500 may be transition fit, or interference fit in the outer shaft 190 at mating surfaces of the rim portion 520 and the outer shaft 190, such that the second fluid flow device 500 rotates together with the outer shaft 190. An inner peripheral portion 511 of the wall portion 510 defines an opening 512 at a central portion of the wall portion 510, such that the wall portion 510 has a radial dimension D2 (similar to the second fluid flow device 300 described above with respect to FIGS. 3A and 3B) from the inner peripheral portion 511 to the outer peripheral portion 515 of the wall portion 510 of the second fluid flow device 500.

In the example arrangement shown in FIGS. 5A-5C, the second fluid flow device 500 includes one or more protrusions 550, or baffles 550, extending radially inward, from the rim portion 520 and a corresponding portion of the wall portion 510 toward the opening 512, into the fluid flow area 590. Each of the one or more baffles 550 may have a height H2, a width W2, and a length L2, as shown in FIG. 5C. The height H2, width W2 and length L2 of the baffles 550 may vary, based on a number of baffles 550, an arrangement of the baffles 550, fluid flow velocities, lubrication and cooling requirements, system sizing, and other such factors.

As with the second fluid flow device 300 described above with respect to FIGS. 3A and 2B, the radial dimension D2 of the wall portion 510 of the second fluid flow device 500 is less than the radial dimension D1 of the wall portion 410 of the first fluid flow device 400. The radial dimension D2 of the wall portion 510 of the second fluid flow device 500 may be such that the wall portion 510 allows oil from within the rotatable shaft assembly 100 (in particular, from the second inner bearing 130B) to flow towards the adjacent second outer bearing 140B for discharge from the rotatable shaft assembly 100. For example, the radial dimension D2 of the wall portion 510 is small enough to allow a first portion of the oil (for example, from the second inner bearing 130B) to flow through the opening 512, such that the wall portion 510 does not inhibit the flow of oil to the second outer bearing 140B for eventual discharge from the rotatable shaft assembly 100 (for example, at the arrows F1', F2' and F3' shown in FIGS. 1B-1D, respectively).

In some examples, one or more channels 530 are formed in a side of the wall portion 510 opposite the one or more baffles 550. The one or more channels 530 are in communication, for example fluid communication, with the opening 512. A second portion of the oil flowing through the opening 512 of the second fluid flow device 500 can be directed through the one or more channels 530, for discharge at a corresponding portion of the outer shaft 190 (for example, at the arrows F1", F2" and F3" shown in FIGS. 1B-1D, respectively). In the example shown in FIGS. 5A-5C, the one or more channels 530 are radial channels. The principles described herein can be applied to channels having other orientations and/or combinations of orientations.

In the example arrangement shown in FIGS. 5A-5C, the second fluid flow device 500 includes a plurality of baffles 550, all having substantially the same height and/or width and/or length, with the plurality of baffles 550 being arranged circumferentially about an axial centerline of the second fluid flow device 500, and arranged symmetrically about a central plane of the second fluid flow device 500, simply for purposes of discussion and illustration. In some examples, the second fluid flow device 500 can include more, or fewer, baffles 550 than shown in FIGS. 5A-5C, and/or combinations of sizes of baffles 550 and/or arrangements of baffles 550 about the axial centerline and/or central plane of the second fluid flow device 500. A size and/or combination of sizes and/or an arrangement of the plurality of baffles 550 along the rim portion 520 of the second fluid flow device 500 may be selected to continue to drive the flow of oil in an axial direction from the second inner bearing 130B, with a first portion flowing through the opening 312 for discharge through the second outer bearing 140B (i.e., the discharge path identified by the arrows F1', F2' and F3' shown in FIGS. 1B-1D, respectively), and a second portion being directed to the outer shaft 190 for discharge (i.e., the discharge path identified by the arrows F1", F2" and F3"). That is, a size and/or a number and/or an arrangement of the baffles 550 along the rim portion 520 of the second fluid flow device 500 may be selected so that the action imparted on the oil by the baffles 550 drives the flow of oil in the desired direction. Similarly, a size and/or a number and/or an arrangement of the channels 530 defined in the wall portion 510 may be selected to facilitate the effective and efficient flow of oil for discharge. Thus, the baffles 550 may define a first physical feature of the second fluid flow device 500 that draw the oil axially through the rotatable shaft assembly 100 for discharge thorough the second outer bearing 140B as the second fluid flow device 500 rotates together with the outer shaft 190 and the baffles 550 act on the oil in the rotatable shaft assembly 100. The channels 530 act as a second physical feature that draw the oil radially from the opening 512 of the second fluid flow device 500 as the second fluid flow device 300 rotates together with the outer shaft 190.

A lubrication and/or cooling system, in accordance with implementations described herein, includes a first fluid flow device at a first axial end portion of a rotatable shaft assembly, and a second fluid flow device at a second end portion of a rotatable shaft assembly. The first fluid flow device facilitates the introduction of lubrication and/or cooling media, or fluid, such as oil, into the rotatable shaft assembly. One or more features of the first fluid flow device drive the introduced fluid in an axial direction, and act on the fluid to distribute and circulate the fluid substantially uniformly as the fluid is driven axially through the rotatable shaft assembly. The second fluid flow device includes one or more features that draws the fluid axially and circulates the fluid through the rotatable shaft assembly, and that facilitates the discharge of the fluid from the rotatable shaft assembly. The action provided by the rotation of the first fluid flow device and the second fluid flow device provide for efficient and effective lubrication and/or cooling of the rotatable shaft assembly. Improved lubrication and/or cooling of the rotatable shaft assembly can improve overall system performance and reliability.

Terms such as "substantially" and "about" used herein are used to describe and account for small fluctuations, such as due to variations in processing. Also, when used herein, indefinite articles such as "a" or "an" may refer to "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, any logic flows depicted herein do not require the particular order shown, or sequential order, to achieve desirable results. In addition, other processes may be provided, or processes may be eliminated, from the described flows, and other components may be added to and/or removed from the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A fluid flow system for a rotatable shaft assembly, the fluid flow system comprising:
   a first fluid flow device configured to be coupled in a first portion of a rotatable shaft, wherein an output shaft extends inside the rotatable shaft, the first fluid flow device including at least one physical feature configured to retain fluid in the rotatable shaft and guide a flow of the fluid in an axial direction in the rotatable shaft;

a second fluid flow device configured to be coupled in a second portion of the rotatable shaft, spaced axially apart from the first fluid flow device, the second fluid flow device including at least one physical feature configured to guide the flow of the fluid axially through the rotatable shaft, from the first fluid flow device toward the second fluid flow device, wherein the fluid is discharged along at least one discharge path from the rotatable shaft;

wherein the first fluid flow device includes:

a wall portion with an opening formed in a central portion thereof, the wall portion defining a first physical feature of the first fluid flow device;

a rim portion extending from a circumferential portion of the wall portion, the rim portion defining a mating surface configured to be coupled to a mating surface of the rotatable shaft such that the first fluid flow device rotates together with the rotatable shaft; and a plurality of baffles arranged circumferentially along the rim portion and corresponding portions of the wall portion, the plurality of baffles defining a second physical feature of the first fluid flow device; and wherein the second fluid flow device includes:

a wall portion with an opening formed in a central portion thereof;

a rim portion extending from a circumferential portion of the wall portion, defining a mating surface configured to be coupled to a mating surface of the rotatable shaft such that the second fluid flow device rotates together with the rotatable shaft;

a plurality of baffles arranged circumferentially along the rim portion and corresponding portions of the wall portion, the plurality of baffles defining a first physical feature of the second fluid flow device; and a plurality of channels formed in the wall portion, in fluid communication with the opening, the plurality of channels defining a second physical feature of the second fluid flow device.

2. The fluid flow system of claim 1, wherein the at least one physical feature of the first fluid flow device includes:

the first physical feature defining an inlet for introducing the fluid into the rotatable shaft, and for retaining the fluid in the rotatable shaft; and the second physical feature configured to guide the flow of the fluid in the axial direction in the rotatable shaft; and the at least one physical feature of the second fluid flow device includes:

the first physical feature configured to guide the fluid axially through the rotatable shaft, from the first fluid flow device toward the second fluid flow device; and the second physical feature configured to discharge the fluid along the at least one discharge path from the rotatable shaft.

3. The fluid flow system of claim 1, wherein the opening of the wall portion defines an inlet for introducing fluid into the rotatable shaft, and wherein a radial dimension of the wall portion inhibits a backflow of fluid out of the rotatable shaft.

4. The fluid flow system of claim 1, wherein the plurality of baffles of the first fluid flow device extend radially inward along the wall portion, from the rim portion toward the opening, wherein the plurality of baffles of the first fluid flow device are configured to guide the flow of the fluid in an axial direction toward the second fluid flow device in response to rotation of the rotatable shaft.

5. The fluid flow system of claim 1, wherein a radial dimension of the wall portion of the second fluid flow device allows fluid to flow in the axial direction through the opening of the second fluid flow device to an adjacent bearing for discharge from the rotatable shaft.

6. The fluid flow system of claim 5, wherein the plurality of baffles of the second fluid flow device extend radially inward along the wall portion of the second fluid flow device, from the rim portion of the second fluid flow device toward the opening of the second fluid flow device, wherein the plurality of baffles of the second fluid flow device are configured to guide the fluid in the axial direction from the first fluid flow device in response to rotation of the rotatable shaft.

7. The fluid flow system of claim 5, wherein the plurality of channels of the second fluid flow device are configured to receive a portion of the fluid flowing in the axial direction through the opening of the second fluid flow device, and to direct the portion of the fluid to an inner surface of the rotatable shaft for discharge from the rotatable shaft.

8. The fluid flow system of claim 1, wherein the first fluid flow device is configured to be transition fit in the rotatable shaft, assembled between a first outer bearing and a first inner bearing, and the second fluid flow device is configured to be transition fit in the rotatable shaft, assembled between a second inner bearing and a second outer bearing, spaced apart from the assembled first outer bearing, first fluid flow device and first inner bearing.

9. The fluid flow system of claim 8, wherein the fluid flow system is configured to circulate the fluid between the first fluid flow device and the second fluid flow device for at least one of cooling or lubrication of differential components in a space formed between the first fluid flow device and the second fluid flow device.

10. A fluid flow system, comprising:

a first fluid flow device coupled in a first portion of a rotatable shaft assembly in which an output shaft extends inside a rotatable shaft, the first fluid flow device including:

a wall portion;

an inlet defined in a central portion of the wall portion for introduction of cooling media into the rotatable shaft assembly, the wall portion being configured to retain the cooling media in the rotatable shaft assembly; and a rim portion extending along a circumferential portion of the wall portion, the rim portion defining a mating surface configured to be coupled to a mating surface of an outer shaft of the rotatable shaft assembly; and a second fluid flow device in a second portion of the rotatable shaft assembly, spaced axially apart from the first fluid flow device, the second fluid flow device including:

a wall portion;

an opening defined in a central portion of the wall portion, the opening being configured to guide the cooling media to at least one discharge path for discharge from the rotatable shaft assembly; and a rim portion extending along a circumferential portion of the wall portion, the rim portion defining a mating surface configured to be coupled to a mating surface of the outer shaft of the rotatable shaft assembly;

wherein the first fluid flow device includes at least one baffle at a portion of the rim portion and a corresponding portion of the wall portion of the first fluid flow device, wherein the at least one baffle is configured to guide the cooling media axially through the rotatable shaft assembly toward the second fluid flow device; and wherein the second fluid flow device includes at least one baffle at a portion of the rim portion and a corresponding portion of the wall portion of the second fluid flow device, extending radially inward from the rim portion toward the opening of the second fluid flow device, wherein the at least one baffle is configured to guide the cooling media axially through the rotatable shaft assembly from the first fluid flow device toward the second fluid flow device.

11. The fluid flow system of claim 10, wherein a radial dimension of the wall portion of the first fluid flow device inhibits backflow of the cooling media to retain the cooling media in the rotatable shaft assembly.

12. The fluid flow system of claim 10, wherein the at least one baffle includes a plurality of baffles arranged along the rim portion and corresponding portions of the wall portion of the first fluid flow device, extending radially inward from the rim portion towards the opening of the first fluid flow device, the plurality of baffles being configured to guide the cooling media axially through the rotatable shaft assembly toward the second fluid flow device.

13. The fluid flow system of claim 10, wherein a radial dimension of the wall portion of the second fluid flow device is less than a radial dimension of the wall portion of the first fluid flow device, and wherein the opening in the wall portion of the second fluid flow device is configured to discharge a first portion of the cooling media from the rotatable shaft assembly through a first discharge path.

14. The fluid flow system of claim 13, further comprising at least one channel formed in the rim portion of the second fluid flow device, wherein the at least one channel is configured to discharge a second portion of the cooling media out of the rotatable shaft assembly through a second discharge path.

15. The fluid flow system of claim 14, wherein the at least one channel comprises a plurality of radial channels formed in the rim portion of the second fluid flow device, wherein the plurality of radial channels are configured to discharge the second portion of the cooling media out of the rotatable shaft assembly through the second discharge path.

16. The fluid flow system of claim 15, wherein the first discharge path discharges the first portion of the cooling media along the mating surface of the outer shaft, and the second discharge path discharges the second portion of the cooling media to an adjacent bearing.

* * * * *